(12) United States Patent
Jungen (10) Patent No.: US 8,801,011 B1
(45) Date of Patent: Aug. 12, 2014

(54) ARTICULATABLE SUSPENSION SYSTEM FOR A VEHICLE

(71) Applicant: Preferred Chassis Fabrication, Inc., Tucson, AZ (US)

(72) Inventor: William Dwaine Jungen, Tucson, AZ (US)

(73) Assignee: Preffered Chassis Fabrication, Inc., Tucson, AZ (US)

( * ) Notice: Subject to any disclaimer, the term of this patent is extended or adjusted under 35 U.S.C. 154(b) by 0 days.

(21) Appl. No.: 13/779,198

(22) Filed: Feb. 27, 2013

Related U.S. Application Data

(60) Provisional application No. 61/603,644, filed on Feb. 27, 2012.

(51) Int. Cl.
*B60G 5/00* (2006.01)
*B60G 21/00* (2006.01)
*B60G 9/02* (2006.01)
*B60G 9/00* (2006.01)
*B60G 21/04* (2006.01)

(52) U.S. Cl.
CPC . *B60G 9/00* (2013.01); *B60G 21/04* (2013.01)
USPC ..... 280/104; 280/682; 280/788; 280/124.111

(58) Field of Classification Search
CPC .. B60G 21/002; B60G 21/023; B60G 21/055; B60G 7/006; B60G 7/008; B60G 7/02; B60G 9/02; B60G 9/022; B60G 9/025; B60G 2200/32; B60G 2200/322; B60G 2200/34; B60G 2204/15; B62D 21/11
USPC .......... 180/311, 908; 280/104, 676, 677, 682, 280/781, 788, 124.106, 124.107, 124.109, 280/124.111, 124.116

See application file for complete search history.

(56) References Cited

U.S. PATENT DOCUMENTS 1,391,192 A    9/1921   Kelsey
2,154,463 A *  4/1939   Littman ........................ 280/104
(Continued)

FOREIGN PATENT DOCUMENTS

FR    7352     7/1907
FR    569728   4/1924
FR    993263   10/1951

OTHER PUBLICATIONS

Grasmehr, G., "Scorpion MK1: Over the Top, This Vehicle Brings a New Twist to the 4x4 Scene," Four Wheeler, Jan. 1998 (6 pgs).

(Continued)

*Primary Examiner* — Paul N Dickson
*Assistant Examiner* — Laura Freedman
(74) *Attorney, Agent, or Firm* — Hayes Soloway P.C.

(57) ABSTRACT

An articulatable suspension system for a vehicle includes a front axle assembly, a front pivot assembly, a rear axle assembly, a rear pivot assembly, a frame and at least one equalizer bar. The front axle is pivotally coupled to the front pivot assembly such that the front axle assembly is rotatable about at least one of a longitudinal axis or a lateral axis passing through the front pivot assembly. The rear axle is pivotally coupled to the rear pivot assembly such that the rear axle assembly is rotatable about at least one a longitudinal axis or a lateral axis passing through the rear pivot assembly. Front and rear dampeners extend between the front and rear axle assemblies and the frame. An equalizer bar is coupled to the front and rear pivoting assemblies by front and rear vertical linkages. The equalizer bar is pivotally secured to the frame.

16 Claims, 4 Drawing Sheets

(56) References Cited

U.S. PATENT DOCUMENTS

| | | | |
|---|---|---|---|
| 2,437,823 A | 3/1948 | Jonkhoff | 280/48 |
| 2,466,833 A | 4/1949 | Allen | 280/104 |
| 2,811,370 A | 10/1957 | Gramatzki | 280/112 |
| 3,292,943 A | 12/1966 | Crockett | 280/104 |
| 3,356,385 A | 12/1967 | Small | 280/104.5 |
| 3,471,166 A | 10/1969 | Clark | 280/104.5 |
| 3,520,548 A | 7/1970 | McGee | 280/104.5 |
| 4,205,730 A | 6/1980 | McColl | 180/261 |
| 4,840,394 A | 6/1989 | Bickler | 280/677 |

OTHER PUBLICATIONS

"About Scorpion Vehicles," downloaded from http://scorpioncars.com/_about.htm , Mar. 13, 2013 (1 pg).

\* cited by examiner

ARTICULATABLE SUSPENSION SYSTEM FOR A VEHICLE

CROSS REFERENCE TO RELATED APPLICATION

This application claims priority from U.S. Provisional Application Ser. No. 61/603,644 filed Feb. 27, 2012.

FIELD

The present invention relates generally to a suspension system for wheeled vehicles. More particularly, the present invention relates to an articulating suspension system for a vehicle with four wheels. The invention has particular utility in connection with a vehicle for use in traversing rough terrain.

BACKGROUND

Wheeled vehicles have been known for centuries and several various types of suspension systems have been adopted to smooth the vehicle ride for occupants. Conventional suspension systems used on automobiles typically include coil springs and/or leaf springs that secure the wheel axles to the vehicle frame or carriage. In these arrangements, the springs support the vehicle frame above the axle to soften the ride. These conventional suspension systems have been refined and are particularly suited for use with vehicles commonly driven over relatively smooth surfaces such as roads and the like. Further, when traveling over smooth surfaces such as roads, vehicles are generally driven at relatively high speeds and they typically require suspension systems that are "tight." However, such "tight" systems often fail to perform satisfactorily when the vehicle is driven over very rough terrain. As a result, these suspension systems often must be modified for travel over rough terrain. One type of modified vehicle commonly used to traverse rough terrain is often referred to as a four-wheel drive vehicle.

Four-wheel drive vehicles typically employ heavy duty springs and shocks and they also generally supply motive power to both the front and rear wheels. In many other respects, these vehicles are generally very similar to vehicles primarily designed for operation on relatively smooth surfaces. For example, four-wheel drive vehicles often utilize rigid wheel axles or unibody frames that restrict wheel movement in the vertical direction. Such constructions prevent sufficient wheel movement to traverse some obstacles. Also, another vexatious problem experienced with typical four-wheel drive vehicles is that as an individual wheel moves vertically, the remaining wheels lose traction as a result of the spring suspension systems.

To overcome these problems, four-wheel drive vehicles often employ "loose" suspensions that facilitate a wider degree of wheel movement. The aptly named "Monster Trucks" with greatly raised bodies and gigantic tires are examples of such attempts. However, these "loose suspensions" adversely affect the performance of the vehicle when it is driven over normal roads at high speeds. These suspension systems have too much sway or lateral movement and the vehicle bodies tend to "lean" to one side during vehicle movements. This lean can often produce catastrophic results since the vehicle is often plagued by undesirable body sway in curves or during cornering.

SUMMARY

Embodiments of the present disclosure provide an articulatable suspension system for a vehicle, and vehicles including an articulatable suspension system. In this regard, one embodiment of such an articulatable suspension system can be broadly summarized as including a front axle assembly, a front pivot assembly, a rear axle assembly, a rear pivot assembly, a frame and at least one equalizer bar. The front axle assembly may include a front axle and a front rigid member attached to the front axle. The front rigid member may be pivotally attached to the front pivot assembly such that the front axle assembly is operatively rotatable about at least one of a longitudinal axis or a lateral axis passing through the front pivot assembly. The rear axle assembly may include a rear axle and a rear rigid member attached to the rear axle, and the rear rigid member may be pivotally attached to the rear pivot assembly such that the rear axle assembly is operatively rotatable about at least one a longitudinal axis or a lateral axis passing through the rear pivot assembly. The frame may be flexibly supported by the front and rear axle assemblies, and at least one front dampener may extend between the front axle assembly and the frame, and at least one rear dampener may extend between the rear axle assembly and the frame, the front and rear dampeners being configured to dampen movements. At least one equalizer bar may extend between the front and the rear pivoting assemblies and may be coupled to the front and rear pivoting assemblies by front and rear vertical linkages. The at least one equalizer bar may be intermediately secured to the frame by an intermediate pivot to prevent lateral frame movement during axle movements, and the at least one equalizer bar may be configured to transfer movements between the front and rear axles.

In a further embodiment, the present disclosure provides an off-road vehicle with an articulatable suspension system, the system including a front axle assembly including a front axle and a front rigid member attached to the front axle; a front pivot assembly, the front rigid member being pivotally attached to the front pivot assembly such that the front axle assembly is operatively rotatable about at least one of a longitudinal axis or a lateral axis passing through the front pivot assembly; a rear axle assembly including a rear axle and a rear rigid member attached to the rear axle; a rear pivot assembly, the rear rigid member being pivotally attached to the rear pivot assembly such that the rear axle assembly is operatively rotatable about at least one a longitudinal axis or a lateral axis passing through the rear pivot assembly; a frame flexibly supported by the front and rear axle assemblies, the frame having at least one front dampener extending between the front axle assembly and the frame, and at least one rear dampener extending between the rear axle assembly and the frame, the front and rear dampeners being configured to dampen movements; and at least one equalizer bar extending between the front and the rear pivoting assemblies and coupled to the front and rear pivoting assemblies by front and rear vertical linkages, the equalizer bar intermediately secured to the frame by an intermediate pivot to prevent lateral frame movement during axle movements, the at least one equalizer bar configured to transfer movements between the axles.

In yet another embodiment, the present disclosure provides a vehicle adapted to travel over rough terrain, the vehicle including a front axle assembly including a front axle and a front rigid member attached to the front axle, the front axle having wheels mounted on spaced apart ends; a front pivot assembly, the front rigid member being pivotally attached to the front pivot assembly such that the front axle assembly is operatively rotatable about at least one of a longitudinal axis or a lateral axis passing through the front pivot assembly; a rear axle assembly including a rear axle and a rear rigid member attached to the rear axle, the rear axle having wheels mounted on spaced apart ends; a rear pivot assembly, the rear rigid member being pivotally attached to the rear pivot assembly such that the rear axle assembly is operatively rotatable about at least one a longitudinal axis or a lateral axis passing through the rear pivot assembly; a frame flexibly supported by the front and rear axle assemblies, the frame having at least one front dampener extending between the front axle assembly and the frame, and at least one rear dampener extending between the rear axle assembly and the frame, the front and rear dampeners being configured to dampen movements; and at least one equalizer bar extending between the front and the rear pivoting assemblies and coupled to the front and rear pivoting assemblies by front and rear vertical linkages, the equalizer bar intermediately secured to the frame by an intermediate pivot to prevent lateral frame movement during axle movements, the at least one equalizer bar configured to transfer movements between the axles.

The embodiments provided by the present disclosure overcome the problems associated with the known prior art. The vehicle excels at traversing rough terrain and its articulating suspension allows the vehicle to climb large objects with ease while preventing catastrophic body lean. The vehicle may also drive along steep inclines (approaching 60°) without catastrophic roll-over. The vehicle may also drive safely over normal roads at normal speeds without concern in curves or during cornering since the articulatable suspension prevents body sway or lean. Consequently, the vehicle can be directly driven from rough terrain onto normal roads without suspension modification.

Thus, an object of the present invention is to provide an improved suspension system that permits an off-road vehicle to safely traverse rough terrain while maintaining sufficient traction to ensure vehicle movement.

Another object of the present invention is to provide a suspension system that maintains a constant load upon each wheel to ensure each wheel's traction would remain substantially constant.

Another object of the present invention is to provide a suspension system for an off-road vehicle that permits the vehicle to be driven safely through curves and corners on normal roads at normal operating speeds.

Yet another object of the present invention is to provide an articulatable suspension system that permits a vehicle to be driven safely without requiring the driver to modify the vehicle suspension.

Another object of the present invention is to provide an off-road vehicle that can traverse significant vertical obstacles safely without body lean.

The features, functions, and advantages that have been discussed can be achieved independently in various embodiments of the present disclosure or may be combined in yet other embodiments further details of which can be seen with reference to the following description and drawings.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE INVENTION

Figure 1:
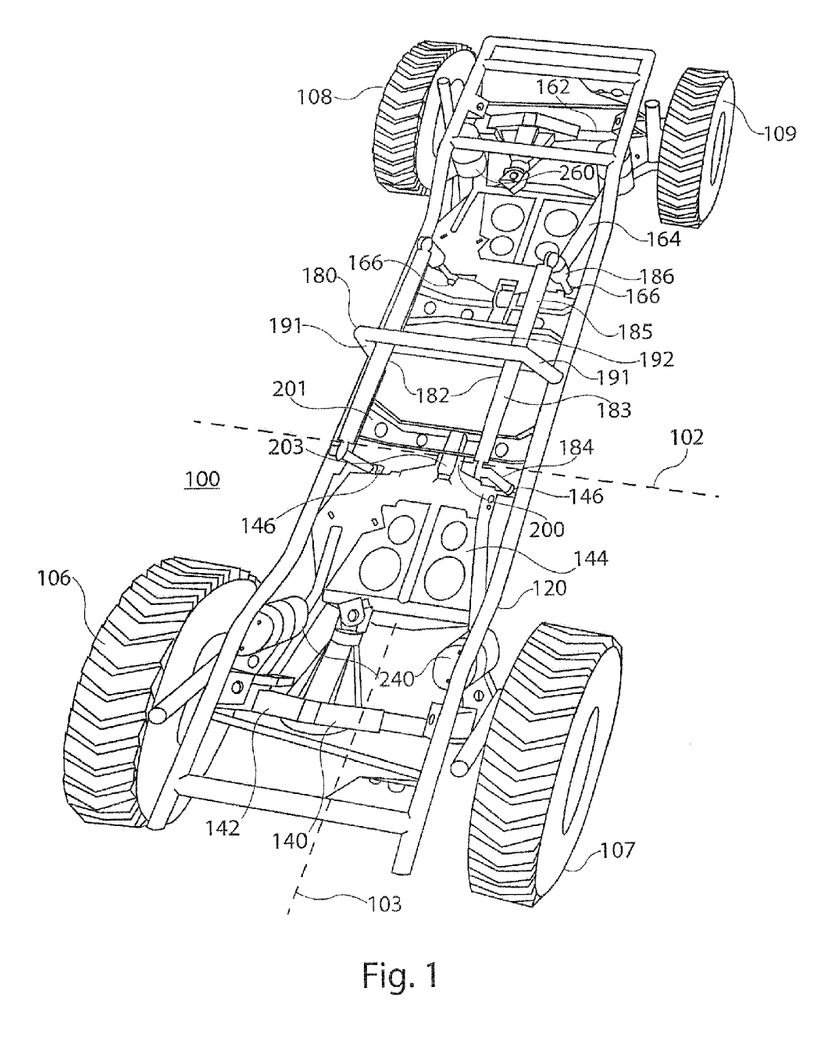
FIG. 1 is top view illustration of an articulatable suspension system for a vehicle, in accordance with an exemplary embodiment of the disclosure.
Figure 2:
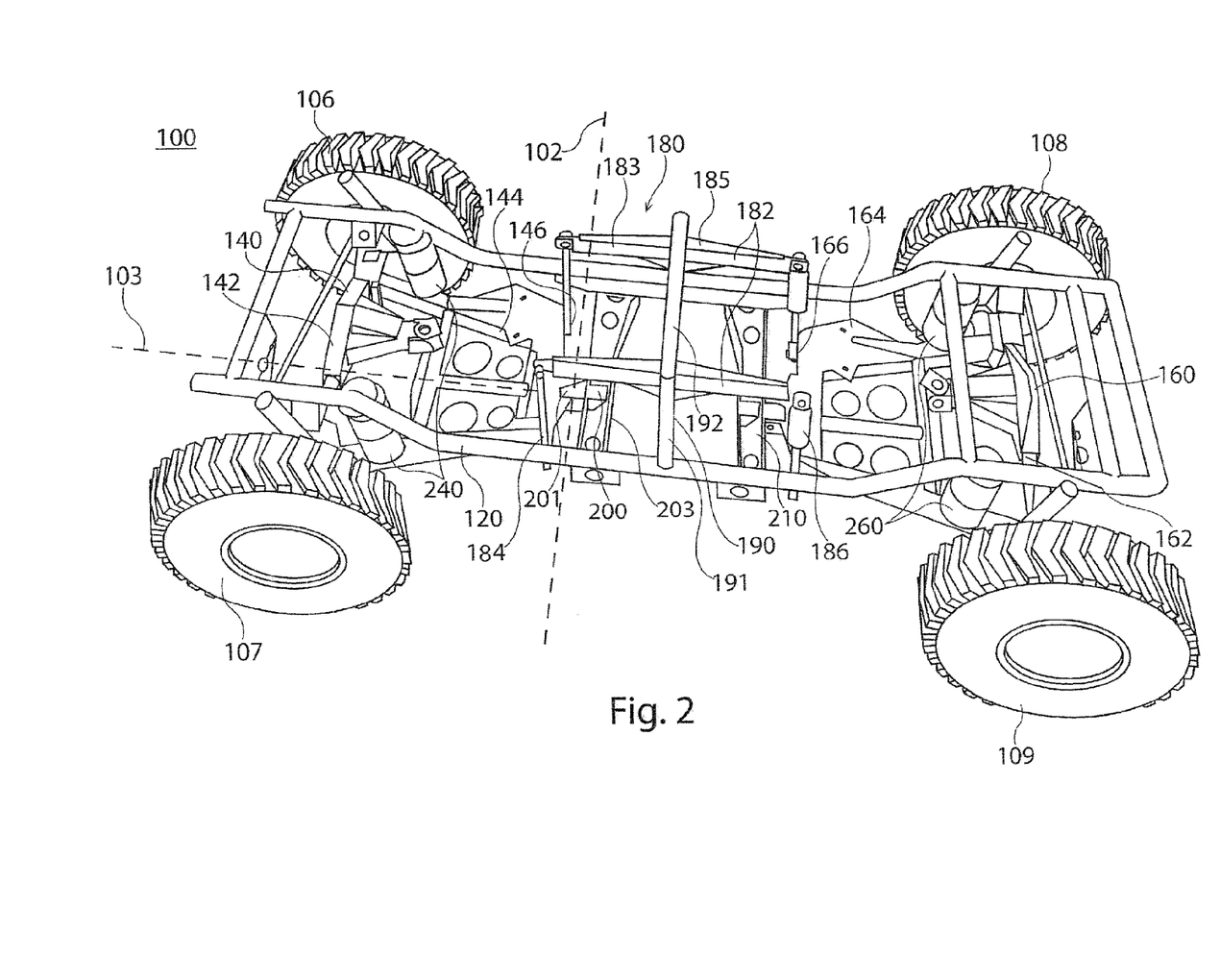
FIG. 2 is a diagonal side and top view illustration of the articulatable suspension system for a vehicle shown in FIG. 1.
Figure 3:
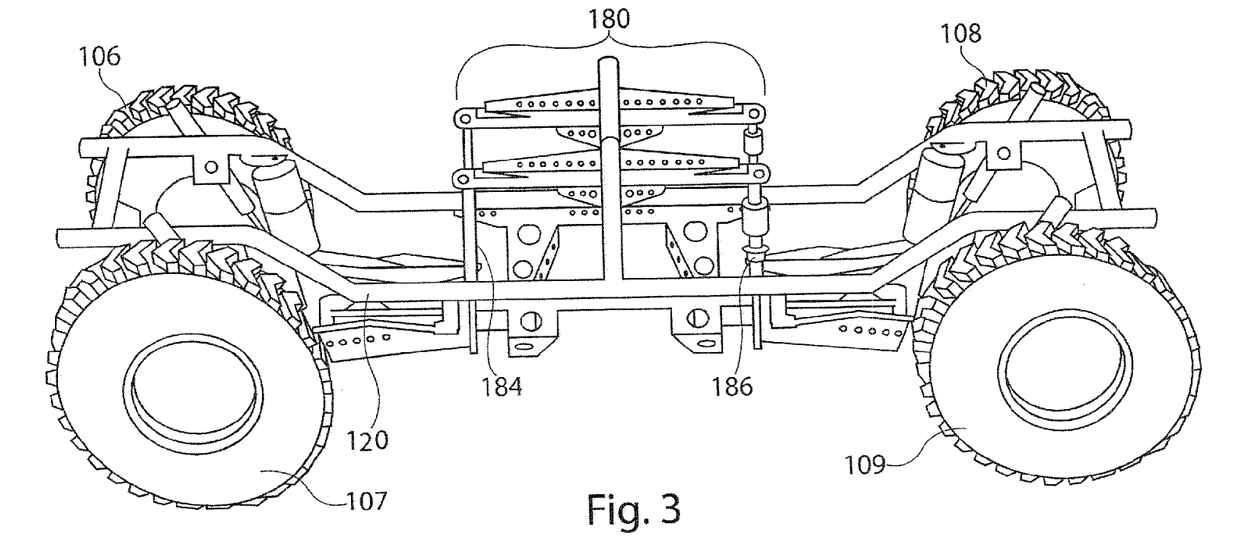
FIG. 3 is a side view illustration of the articulatable suspension system for a vehicle shown in FIG. 1.

FIGS. 1-3 illustrate an articulatable suspension system 100 for a vehicle, which may be or include a vehicle chassis. The vehicle may be, for example, an off-road vehicle. The articulating suspension system 100 permits the vehicle to easily traverse rough terrain and climb large objects while preventing catastrophic body lean. The vehicle may also drive along steep inclines (approaching 60°) without catastrophic roll-over. Furthermore, such a vehicle utilizing the suspension system 100 may also drive safely over normal roads at normal speeds without concern in curves or during cornering since the articulatable suspension prevents body sway or lean. In other words, the vehicle can be directly driven from rough terrain onto normal roads without suspension modification.

The articulatable suspension system 100 may include four wheels 106, 107, 108 and 109 and an integral pivoting frame 120. The frame 120 is connected to a front axle assembly 140 and a rear axle assembly 160, which are rotatably connected by an equalizer system 180, a front pivot assembly 200, and a rear pivot assembly 210.

The front axle assembly 140 includes a rigid axle 142 extending between wheels 106 and 107. A rigid member 144 extends rearwardly from proximate wheels 106 and 107 and is pivotally attached to the front pivot assembly 200. The front pivot assembly 200 may include a lateral attachment member 201, which may be laterally attached to sides of the frame 120. At or near the center of the lateral attachment member 201, the front pivot assembly 200 may further include a flex joint or bearing assembly 203, to which the rigid member 144 may be attached, thereby linking the rigid member 144 to the frame 120, via the front pivot assembly 200. The flex joint or bearing assembly 203 may flex or twist about the vehicle's longitudinal axis 103 to facilitate offset rotary movement of the front axle assembly 140 about the vehicle's longitudinal axis 103. Further, the rigid member 144 may be pivotally attached to the front pivot assembly 200 such the front axle assembly 140 can rotate about the vehicle's lateral axis 102. The rigid member 144 may be a substantially flat plate, which may be generally V-shaped or U-shaped, extending rearwardly from the front axle assembly 140 and generally tapering inwardly toward the front pivot assembly 200. The member 144 may be joined to the axle 142.

Attachment members 146 protrude from member 144 for anchoring one end of the equalizer system 180. The rigid member 144 is rotatably attached to the front pivot assembly 200 as will be more fully discussed. In this manner, the front axle assembly 140 may rotate horizontally with respect to the plane established by the vehicle to move the wheels 106 and 107 vertically and arcuately to climb obstacles as the vehicle moves forwardly or rearwardly. The rear axle assembly 160 is similar to the front axle assembly 140.

The rear axle assembly 160 includes a rigid axle 162 extending between wheels 108 and 109. A rigid member 164 extends forwardly from proximate wheels 108 and 109 and is pivotally attached to the rear pivot assembly 210 to facilitate movement of the rear axle assembly 160 about the vehicle's longitudinal axis 103 and/or lateral axis 102. The rear pivot assembly 210 may include a lateral attachment member, which may be laterally attached to sides of the frame 120. Like the front pivot assembly 200, the rear pivot assembly 210 may include a lateral attachment member, attached to the frame 120, and a flex joint or bearing assembly for attachment of the rear rigid member 164. Attachment members 166 protrude from rigid member 164 for anchoring one end of the equalizer system 180. The rigid member 164 is rotatably attached to the rear pivot assembly 210 as will be more fully discussed. In this manner, the rear axle assembly 160 may rotate horizontally with respect to the plane established by the vehicle to move the wheels 108 and 109 vertically and arcuately to climb obstacles as the vehicle moves forwardly or rearwardly.

As the front or rear axle assemblies 140 and 160 move in the horizontal plane, they cause the frame 120 to react through the equalizer system 180. The equalizer system 180 includes a pair of elongated equalizers 182, each extending between two vertically oriented links 184 and 186, which link the front and rear axle assemblies 140, 160 to the equalizer system 180 and to the frame 120. Link 184 extends between one end of equalizer 182 and front attachment member 146, while link 186 extends between the opposite end of equalizer 182 and rear attachment member 166. The rear links 186 may be or include dampers or shocks to further provide dampening to the frame movement. Equalizer 182 is pivotally secured to a lower cross member 190, which extends horizontally between vertical beams 191 attached to the frame 120. Thus, as either the front or rear axle assembly 140 or 160 rotates horizontally, the equalizer system 180 causes the frame 120 to move correspondingly. The amount of frame movement depends, in part, upon the ratio of the forward equalizer length 183 to rearward equalizer length 185. For example, if the ratio is 1:1 the frame 120 may split the differences of the angular offset of the front and rear axle assemblies 140 and 160 from horizontal. If the ratio is less than 1:1, for example 1:2, the frame 120 moves by 33% more when the front axle assembly 140 moves vertically than the rear axle assembly 160. In other words, the rear assembly 160 can always traverse any object the front assembly 140 clears if the ratio is smaller front-to-rear. It may be desirable that the ratio be smaller than 1:1. An upper cross member 192 may extend horizontally between vertical beams 191, disposed above the lower cross member 190. The upper cross member 192 may provide further support between opposite sides of the frame 120 and the equalizer system 180.

The equalizer system 180 prevents body lean or sway. Since the body of a vehicle is anchored to the frame 120 with conventional bolts and the like, it can only move as the frame 120 moves. Frame 120 is laterally anchored with respect to the wheels by the equalizer system 180. Unlike conventional vehicles, there are not three or more springs supporting the frame 120. The cushioning system of the vehicle will be discussed more fully hereinafter.

The front and rear pivot assemblies 200, 210 include a flex joint or bearing assembly 203 as mentioned hereinabove. The flex joint or bearing assembly 203 permit horizontal rotary movement of the axle assemblies 140, 160 relative to the vehicle's longitudinal axis 103 (i.e., rotational movement about the longitudinal axis 103), while the vertical rotatable attachment of the rigid members 144, 164 to the pivot assemblies 200, 210 permits vertical rotary movement of the axle assemblies 140, 160 relative to the vehicle's longitudinal axis 103 (i.e., rotational movement about the lateral axis 102). Thus, the axle assemblies 140, 160 may pivot in either plane (i.e., rotation about either the longitudinal axis 103 or the lateral axis 102) as necessary to traverse obstacles. However, the frame 120 only pivots in one plane because of the equalizer system 180. The frame 120 does not sway laterally as the vehicle moves over rough terrain but it may longitudinally to cushion the vehicle as it moves forwardly or rearwardly.

The frame 120 is further supported and cushioned by a pair of front dampeners 240, positioned between the front rigid member 144 and the frame 120, proximate the front of the frame. The frame 120 is further supported by a pair of rear dampeners 260, positioned between the rear rigid member 164 and the frame 120, proximate the rear of the frame 120. The dampeners 240, 260 may be any known dampeners, including springs, shocks or airbags. In an embodiment, the dampeners 240, 260 may be pairs of gas-filled bags, preferably airbags, each pair being interconnected by a fluid flow tube. Thus, the pairs of airbags may each perform as a single airbag to primarily dampen vertical axle assembly 140, 160. The dampeners 240, 260 may rotate horizontally (i.e. about the longitudinal axis 103) with the front and rear axle assemblies 140, 160 while providing vertical dampening with respect to the frame 120.

Figure 4:
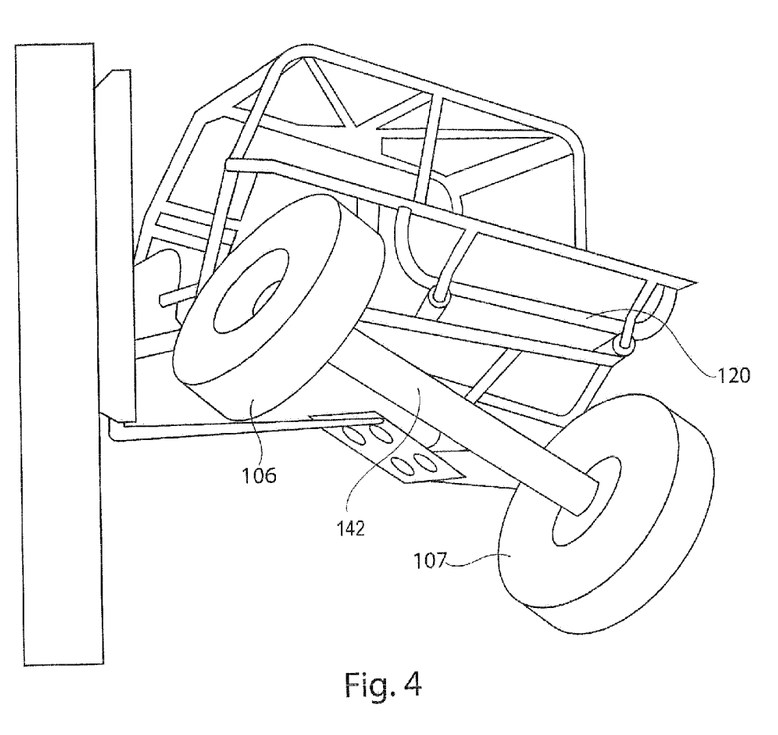
FIG. 4 is a front view illustration of a vehicle having an articulatable suspension system, in accordance with an exemplary embodiment of the disclosure.

As shown in the front view illustration of FIG. 4, the frame 120 of the vehicle remains substantially horizontal even as the front wheel front axle 142 articulates substantially about the vehicle's longitudinal axis 103 (i.e., the front wheel 106 is raised substantially above the level of front wheel 107).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of the present disclosure and protected by the following claims.

What is claimed is:

1. An articulatable suspension system for a vehicle, comprising:
    a front axle assembly comprising a front axle and a front rigid member attached to said front axle;
    a front pivot assembly, said front rigid member being pivotally attached to said front pivot assembly such that said front axle assembly is operatively rotatable about at least one of a longitudinal axis or a lateral axis passing through said front pivot assembly;
    a rear axle assembly comprising a rear axle and a rear rigid member attached to said rear axle;
    a rear pivot assembly, said rear rigid member being pivotally attached to said rear pivot assembly such that said rear axle assembly is operatively rotatable about at least one of a longitudinal axis or a lateral axis passing through said rear pivot assembly;
    a frame flexibly supported by said front and rear axle assemblies, said frame having at least one front dampener extending between said front axle assembly and said frame, and at least one rear dampener extending between said rear axle assembly and said frame, said front and rear dampeners configured to dampen movements; and at least one equalizer bar extending between said front and said rear pivoting assemblies and coupled to said front and rear pivoting assemblies by front and rear vertical linkages, said equalizer bar intermediately secured to said frame by an intermediate pivot to prevent lateral frame movement during axle movements, said at least one equalizer bar configured to transfer movements between said axles, wherein said front pivot assembly comprises a front attachment bar, coupled to said frame by a front lateral attachment member extending laterally between opposite sides of said frame, said front axle assembly being pivotally attached to said front attachment bar such that the front axle assembly is operatively rotatable about a lateral axis passing through said front pivot assembly, and wherein said rear pivot assembly comprises a rear attachment bar, coupled to said frame by a rear lateral attachment member extending laterally between opposite sides of said frame, said rear axle assembly being pivotally attached to said rear attachment bar such that the rear axle assembly is operatively rotatable about a lateral axis passing through said rear pivot assembly.

2. The articulatable suspension system of claim 1, wherein said front attachment bar comprises a front flex joint or bearing assembly operatively configured to twist about a longitudinal axis passing through said front pivot assembly, and wherein said rear attachment bar comprises a rear flex joint or bearing assembly operatively configured to twist about a longitudinal axis passing through said rear pivot assembly.

3. The articulatable suspension system of claim 1, comprising two equalizer bars, each extending between said front and said rear pivoting assemblies and coupled to said front and rear pivoting assemblies by front and rear vertical linkages, each of said equalizer bars being intermediately secured to said frame by an intermediate pivot to prevent lateral frame movement during axle movements.

4. The articulatable suspension system of claim 1, comprising a pair of front dampeners extending between said front axle assembly and said frame, and a pair of rear dampeners extending between said rear axle assembly and said frame.

5. The articulatable suspension system of claim 1, wherein said front and rear dampeners comprise airbags.

6. The articulatable suspension system of claim 5, wherein said front and rear airbags are configured to be selectively inflated or deflated to adjust the stiffness of said airbag.

7. The articulatable suspension system of claim 1, wherein said rear vertical linkages comprise vertical dampeners for dampening frame movement.

8. An off-road vehicle with an articulatable suspension system, said system comprising:
a front axle assembly comprising a front axle and a front rigid member attached to said front axle;
a front pivot assembly, said front rigid member being pivotally attached to said front pivot assembly such that said front axle assembly is operatively rotatable about at least one of a longitudinal axis or a lateral axis passing through said front pivot assembly;
a rear axle assembly comprising a rear axle and a rear rigid member attached to said rear axle;
a rear pivot assembly, said rear rigid member being pivotally attached to said rear pivot assembly such that said rear axle assembly is operatively rotatable about at least one of a longitudinal axis or a lateral axis passing through said rear pivot assembly;
a frame flexibly supported by said front and rear axle assemblies, said frame having at least one front dampener extending between said front axle assembly and said frame, and at least one rear dampener extending between said rear axle assembly and said frame, said front and rear dampeners configured to dampen movements; and
at least one equalizer bar extending between said front and said rear pivoting assemblies and coupled to said front and rear pivoting assemblies by front and rear vertical linkages, said equalizer bar intermediately secured to said frame by an intermediate pivot to prevent lateral frame movement during axle movements, said at least one equalizer bar configured to transfer movements between said axles,
wherein said front pivot assembly comprises a front attachment bar, coupled to said frame by a front lateral attachment member extending laterally between opposite sides of said frame, said front axle assembly being pivotally attached to said front attachment bar such that the front axle assembly is operatively rotatable about a lateral axis passing through said front pivot assembly, and
wherein said rear pivot assembly comprises a rear attachment bar, coupled to said frame by a rear lateral attachment member extending laterally between opposite sides of said frame, said rear axle assembly being pivotally attached to said rear attachment bar such that the rear axle assembly is operatively rotatable about a lateral axis passing through said rear pivot assembly.

9. A vehicle adapted to travel over rough terrain, said vehicle comprising:
a front axle assembly comprising a front axle and a front rigid member attached to said front axle, said front axle having wheels mounted on spaced apart ends;
a front pivot assembly, said front rigid member being pivotally attached to said front pivot assembly such that said front axle assembly is operatively rotatable about at least one of a longitudinal axis or a lateral axis passing through said front pivot assembly;
a rear axle assembly comprising a rear axle and a rear rigid member attached to said rear axle, said rear axle having wheels mounted on spaced apart ends;
a rear pivot assembly, said rear rigid member being pivotally attached to said rear pivot assembly such that said rear axle assembly is operatively rotatable about at least one of a longitudinal axis or a lateral axis passing through said rear pivot assembly;
a frame flexibly supported by said front and rear axle assemblies, said frame having at least one front dampener extending between said front axle assembly and said frame, and at least one rear dampener extending between said rear axle assembly and said frame, said front and rear dampeners configured to dampen movements; and
at least one equalizer bar extending between said front and said rear pivoting assemblies and coupled to said front and rear pivoting assemblies by front and rear vertical linkages, said equalizer bar intermediately secured to said frame by an intermediate pivot to prevent lateral frame movement during axle movements, said at least one equalizer bar configured to transfer movements between said axles,
wherein said front pivot assembly comprises a front attachment bar, coupled to said frame by a front lateral attachment member extending laterally between opposite sides of said frame, said front axle assembly being pivotally attached to said front attachment bar such that the front axle assembly is operatively rotatable about a lateral axis passing through said front pivot assembly, and wherein said rear pivot assembly comprises a rear attachment bar, coupled to said frame by a rear lateral attachment member extending laterally between opposite sides of said frame, said rear axle assembly being pivotally attached to said rear attachment bar such that the rear axle assembly is operatively rotatable about a lateral axis passing through said rear pivot assembly.

10. The vehicle of claim 9, wherein said front attachment bar comprises a front flex joint or bearing assembly operatively configured to twist about a longitudinal axis passing through said front pivot assembly, and wherein said rear attachment bar comprises a rear flex joint or bearing assembly operatively configured to twist about a longitudinal axis passing through said rear pivot assembly.

11. The vehicle of claim 9, comprising two equalizer bars, each extending between said front and said rear pivoting assemblies and coupled to said front and rear pivoting assemblies by front and rear vertical linkages, each of said equalizer bars being intermediately secured to said frame by an intermediate pivot to prevent lateral frame movement during axle movements.

12. The vehicle of claim 9, comprising a pair of front dampeners extending between said front axle assembly and said frame, and a pair of rear dampeners extending between said rear axle assembly and said frame.

13. The vehicle of claim 9, wherein said front and rear dampeners comprise gas-filled bags.

14. The vehicle of claim 13, wherein said gas-filled bags comprise airbags.

15. The vehicle of claim 13, wherein said front and rear airbags are configured to be selectively inflated or deflated to adjust the stiffness of said airbag.

16. The vehicle of claim 9, wherein said rear vertical linkages comprise vertical dampeners for dampening frame movement.

* * * * *